United States Patent
Ihle et al.

(10) Patent No.: US 12,316,168 B2
(45) Date of Patent: May 27, 2025

(54) ELECTRIC MACHINE HAVING AN ELECTRIC SLIDING CONTACT

(71) Applicant: Robert Bosch GmbH, Stuttgart (DE)

(72) Inventors: Daniel Ihle, Sinzheim (DE); Matthias Baumann, Lahr (DE)

(73) Assignee: Robert Bosch GmbH, Stuttgart (DE)

( * ) Notice: Subject to any disclaimer, the term of this patent is extended or adjusted under 35 U.S.C. 154(b) by 237 days.

(21) Appl. No.: 18/042,848

(22) PCT Filed: Aug. 10, 2021

(86) PCT No.: PCT/EP2021/072299
§ 371 (c)(1),
(2) Date: Feb. 24, 2023

(87) PCT Pub. No.: WO2022/043052
PCT Pub. Date: Mar. 3, 2022

(65) Prior Publication Data
US 2023/0299644 A1  Sep. 21, 2023

(30) Foreign Application Priority Data
Aug. 24, 2020 (DE) .................... 20 2020 005 555.7

(51) Int. Cl.
*H02K 11/01* (2016.01)
*H02K 5/15* (2006.01)
*H02K 7/00* (2006.01)

(52) U.S. Cl.
CPC .......... *H02K 11/0141* (2020.08); *H02K 5/15* (2013.01); *H02K 7/003* (2013.01); *H02K 2211/03* (2013.01)

(58) Field of Classification Search
CPC ....... H02K 11/0141; H02K 5/15; H02K 7/003
See application file for complete search history.

(56) References Cited

U.S. PATENT DOCUMENTS 3,032,687 A * 5/1962 Penn ..................... F02P 1/086
  310/70 R
4,515,417 A * 5/1985 Shiraishi ............. H02K 5/1732
  384/537

(Continued)

FOREIGN PATENT DOCUMENTS

CN  109194039  * 1/2019 ............... H02K 5/22
DE  4225496 A1  2/1994

(Continued)

OTHER PUBLICATIONS

Translation of International Search Report for Application No. PCT/EP2021/072299 dated Nov. 19, 2021 (2 pages).

*Primary Examiner* — Terrance L Kenerly
(74) *Attorney, Agent, or Firm* — Michael Best & Friedrich LLP

(57) ABSTRACT

Electric machine (10), in particular for adjusting movable parts in a motor vehicle, having a stator housing (22) which accommodates a stator (12) and a rotor (14), wherein the rotor (14) has a rotor shaft (16), and the stator housing (22) has an axial opening (24) through which the rotor shaft (16) projects out of the stator housing (22), wherein an electrically conductive shielding plate (29) is arranged transverse to the rotor shaft (16) and substantially covers the entire opening (24), and an electrically conductive sliding contact (77), which is electrically conductively connected to the shielding plate (29), is formed on the rotor shaft (16).

21 Claims, 6 Drawing Sheets

(56) References Cited

U.S. PATENT DOCUMENTS

| | | | | |
|---|---|---|---|---|
| 5,367,416 A | * | 11/1994 | Cossette | G11B 33/1493 |
| | | | | 360/99.18 |
| 5,661,356 A | * | 8/1997 | Fisher | H01R 39/12 |
| | | | | 439/29 |
| 2016/0315524 A1 | | 10/2016 | Ozaki | |

FOREIGN PATENT DOCUMENTS

| | | |
|---|---|---|
| DE | 102016210314 A1 | 1/2018 |
| DE | 102017222281 A1 | 6/2019 |
| EP | 1130745 A2 | 9/2001 |
| EP | 3542449 | 9/2019 |
| WO | 2015197574 A1 | 12/2015 |
| WO | 2018153520 A1 | 8/2018 |

* cited by examiner

ELECTRIC MACHINE HAVING AN ELECTRIC SLIDING CONTACT

BACKGROUND

The present invention relates to an electric machine having an electric sliding contact.

With DE 42 25 496 A1, an electric drive unit has become known, in which an intermediate frame is arranged between a pole pot and a transmission housing, in which a brush holder is integrated. The drive unit is of a modular design, wherein a separately formed plug can be arranged at different positions on the drive unit. As a result, different variants can, for example, be realized with or without an electronic housing and, depending on the installation position of the drive unit, the plug connector can be adapted according to the space conditions and the customer-specific mating plug. The electronic housing with the electronic circuit board accommodated therein is always arranged radially outside the pole housing. It is disadvantageous in such an embodiment that the electronic circuit board with the different electronic components radiates electromagnetic interference radiation (EMC), which may be disruptive for other electronic functions in the motor vehicle. In addition, the brush contact in the intermediate frame also causes interference radiation, which radiates through the plastic transmission housing to the environment. This disadvantage is to be rectified by the electric machine according to the invention.

SUMMARY

In contrast, the electric machine according to the invention has the advantage that by forming an electrically conductive sliding contact between the rotor shaft and an electrical connection to the ground contact of the stator housing, the rotor shaft is prevented from acting as an antenna for the EMC radiation. The stator housing together with the shielding plate and the rotor shaft forms a closed Faraday cage, which, as an EMC shield, shields the arising electromagnetic interference radiation outward. By arranging the shielding plate radially from the flange of the stator housing up to its contacting with the rotor shaft by means of the sliding contact, the carbon brushes and the electronic anti-interference components are optimally shielded thereby. By means of the optimal shielding effect of such a shielding plate connected via the sliding contact to the rotating rotor shaft at least indirectly, an EMC shield can be achieved even for high frequencies up to, for example, 3 GHz.

By the measures listed in the dependent claims, advantageous developments and improvements of the embodiments specified in the independent claim are possible. Preferably, the shielding plate over its entire periphery abuts axially on the flange of the stator housing without interruption so that a continuous shielding cage can be realized on the periphery. In order that the shielding plate over its entire periphery reliably abuts on the flange, the shielding plate has a radial overlap region with the flange. This overlap region conductively abuts on the flange. As a result, a sufficiently low-impedance and symmetrical connection of the shield to the stator housing is ensured over the service life. Additionally, the shielding plate can act as a supporting component since it can be fixedly clamped axially to the flange. Alternatively, the shield may be an integral part of an electronic circuit board. In an axial assembly method, the shielding plate can very simply be clamped axially between the flange of the stator housing and a mating flange of the transmission housing. The transmission housing may be made of plastic in this case. For example, the two housing parts are connected to one another by means of screws or crimping or other material deformation.

If an electrically conductive nonwoven material or fibrous fabric with conductive fibers is used for the sliding contact to the rotor shaft, the mechanical abrasion on the rotor shaft can be minimized, whereby the service life of the electric motor is increased. For example, fabrics with metallic fibers or also graphite or carbon fibers may be used here. Such a conductive nonwoven material can be simply fastened to the adapter element or also directly to the shield. Due to the easily deformable design of the nonwoven material, gaps in the installation space can be used for the sliding contact so that no additional installation space for the sliding contact is required. In this case, the nonwoven material, as a self-supporting structure or in connection with a support structure, can be pressed radially against the rotor shaft in order to form a conductive sliding contact.

By using a metal lattice, in particular a pure metal lattice, e.g., made of copper, a higher conductivity can be achieved, which can further increase the EMC shielding at certain frequency ranges. In the simplest case, a conventional metal wire can also be pressed radially against the rotor shaft by means of an elastic element in order to form the sliding contact. Such a metal lattice can also be well soldered to the metal adapter element or directly to the shielding plate.

According to a further embodiment, a metal tab can radially abut the rotor shaft in a sliding manner, which can generate a higher contact pressure over the entire service life. The wear of the rotor shaft can also be minimized by the specific design of the spring tab. Particularly cost-effectively, the sheet metal tongue can be formed integrally on the adapter element or also directly on the shielding plate, eliminating the need for additional manufacturing and assembly effort.

The sliding contact particularly advantageously consists of a well-conductive metal wire, which elastically resiliently abuts radially on the rotor shaft. Such a wire spring can be integrated into an existing component, such as a shaft bearing, in a very simple and space-saving manner. The spring force can be adjusted via the wire diameter in a simple manner.

Such a wire spring extends particularly favorably around the entire periphery of the rotor shaft, wherein the wire start and the wire end preferably overlap, or are arranged spaced apart by not a small peripheral angle. The wire preferably resiliently abuts on the rotor shaft at several peripheral regions, whereas other peripheral regions are supported radially outward on a rotationally fixed component. The wire spring can in particular be formed as an n-shaped polygonal chain or as a circular corrugated ring.

Axially opposite the brush support plate, a bearing shield having a bearing seat for the rotor bearing is fastened to the other side of the shielding plate. The rotor bearing is formed as a cylindrical or spherical bearing, in particular made of sintered metal. The bearing receptacle is preferably formed integrally with the bearing shield as an injection-molded part. The bearing receptacle is centered in the transmission housing via the bearing shield. As a result, the rotor shaft is mounted at one end in the stator housing and in a middle region via the bearing shield in the transmission housing.

Preferably, the central aperture of the shielding plate for the rotor shaft is shielded by means of a separately manufactured, electrically conductive adapter element that is electrically conductively fastened axially to the shielding plate and simultaneously mechanically to the bearing shield.

As a result, the entire opening of the stator housing is completely electromagnetically sealed over the entire radial region from the metal rotor shaft up to the peripheral flange.

If the sliding contact is arranged directly in the bearing component, a cylindrical receptacle for the electrically conductive spring element is formed therein. A wire spring, preferably a polygonal chain or a radial corrugated spring, is radially supported thereon and presses certain peripheral regions radially against the rotor shaft. In this embodiment, the bearing component is electrically connected to the shield, in particular via the electrically conductive adapter element. For this purpose, axial, resilient sheet metal elements, which abut axially resiliently directly on the bearing component, are formed on the adapter element around the bore. The entire axial opening of the stator housing is tightly shielded by this flat ground contact from the adapter element to the rotor bearing and to the shielding plate.

Alternatively, the sliding contact, which is electrically connected to the shield, may also be formed directly on the adapter element. In this case, the bearing component does not need to be electrically connected to the shielding plate. It is also possible to arrange the sliding contact directly on the shielding plate, for example to form it integrally therewith.

In order to shield the aperture in the shield, the adapter element is preferably formed from a conductive sheet metal as a unilaterally open hollow body, the open end face of which conductively abuts on the shield. Opposite the open side, a bore for accommodating the rotor shaft is formed in the adapter element. The cavity preferably accommodates not only the rotor shaft but also a ring magnet that is arranged thereon and cooperates with a magnet sensor on the printed circuit board, in which the shield is preferably integrated. The cavity can be lined with the electrically conductive nonwoven material or the metal braiding and can form the sliding contact at the bore of the adapter element. The nonwoven material or metal braiding is then advantageously electrically conductively clamped or soldered between the open end face and the shield.

In order to supply power to the electric motor, tubular brushes may be arranged on a brush holder plate arranged below the shield. The brush holder plate is in particular arranged axially completely within the stator housing. For electrical contacting the brushes, they are connected to contact elements of the power supply by means of flexible power strands, for example. The brush support component is preferably made of plastic so that tubes for the brushes can be formed directly integrally thereon. The brush holder component can be
- connected to the bearing shield through the central aperture in the shield, wherein the shield is axially fastened between these two components in order to together form a pre-assembled sandwich component. During pre-assembly of the sandwich component, connecting elements pass through the central aperture of the shielding plate so that the flatly conductive conductor layer of the shielding plate is not interrupted. For example, latching elements and/or clamping elements may be integrally formed on the brush holder and/or on the bearing shield and cooperate with mating latching elements and/or clamping elements of the bearing shield and/or of the brush holder. The brush holder and the bearing shield with the intermediate shielding plate are thus formed as a pre-assembled sandwich component. This sandwich component is centered with respect to the stator housing by means of the brush holder plate and with respect to the transmission housing by means of the outer contour of the bearing receptacle of the bearing shield.

The shielding plate can be particularly cost-effectively integrated into an electronic circuit board, wherein in the insulating substrate of the electronic circuit board, at least one continuously conductive conductor layer, preferably a copper layer, is formed, on which no discontinuities are formed by the formation of circuits or the connection of electronic components. The electronic circuit board can advantageously be populated with all electronic components and the contact elements for the brushes by means of cost-effective and robust SMD (surface-mounted devices) technology. The flatly, continuously conductive conductor layers can be manufactured as standard in the production of the circuit boards, wherein two such flatly conductive conductor layers are preferably arranged as axially inner layers, and the circuits and the electronic components are formed on two further outer conductor layers. In this case, the at least one flatly conductive conductor layer is connected by means of axial vias to at least one axial side surface of the circuit board, which then axially conductively abuts on the flange. Particularly preferably, the vias are arranged within the radial overlap region and thereby connect the electrically conductive overlap region on the underside to the flatly, continuously conductive conductor layer inside the electronic circuit board. In order to provide sufficient EMC shielding, the distances
- between the vias in the peripheral direction must not be too large, in order to reliably shield even high frequencies up to 3 GHz.

Preferably, the adapter element comprises an approximately quadrilateral, in particular rectangular, outer periphery, which engages in a corresponding receptacle in the bearing shield. Axially opposite, the adapter element conductively abuts with this quadrilateral end face axially on the periphery of the corresponding central aperture in the shielding plate. For this purpose, a ground contact region is formed on the top side of the electronic circuit board along the aperture. In this respect, for example, a tin surface layer is electrically connected to at least one inner, flatly uninterrupted conductor layer by means of vias.

BRIEF DESCRIPTION OF THE DRAWINGS

The invention is explained in more detail in the following description with reference to exemplary embodiments shown in the drawings. Shown are.

DETAILED DESCRIPTION

Figure 1:
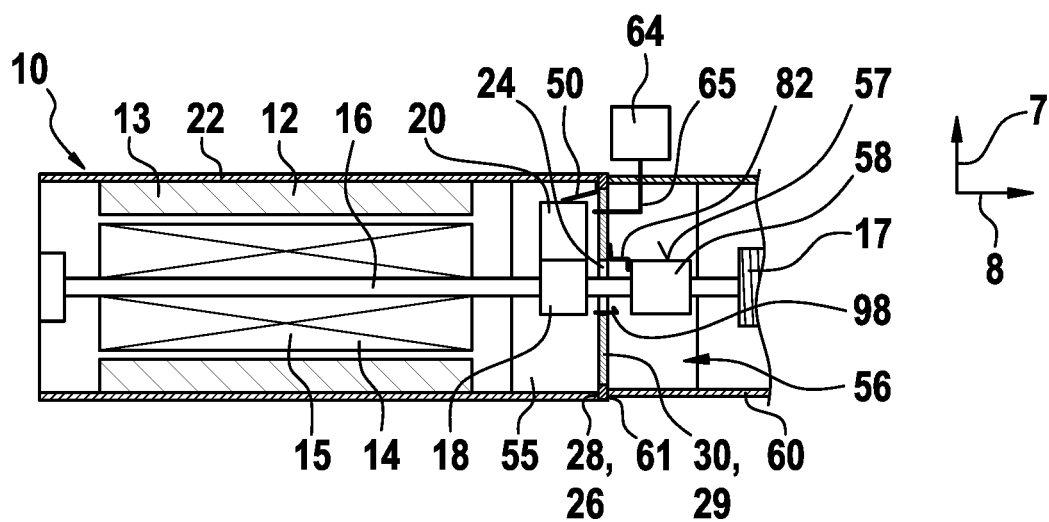
FIG. 1 a general view of an electric machine according to a first exemplary embodiment, and FIG. 2 a further exemplary embodiment of an electric machine with two variants of sliding contacts, FIGS. 3 and 4 two exemplary embodiments of a wire spring as a sliding contact, FIGS. 5 to 8 further embodiments of adapter elements with sliding contacts, and FIG. 9 a further exemplary embodiment of an adapter element.

FIG. 1 shows an electric machine 10, as used in the motor vehicle, for example for adjusting movable parts, preferably window panes, sliding roofs or seat components. In a stator housing 22, a stator 12 is arranged, within which a rotor 14 is arranged, the rotor shaft 16 of which extends axially from the stator housing 22 into an axially adjoining transmission housing 60. The stator 12 preferably comprises permanent magnets 13, which drive an electrical winding 15 of the rotor 14. In so doing, the drive torque is transferred from the rotor shaft 16 to a transmission arranged in the transmission housing 60. An output element 17 is arranged on the rotor shaft 16 and cooperates with other transmission components. As a result, parts of a vehicle seat or a window pane in the motor vehicle are, for example, moved by means of a mechanism (not shown). In the axial direction 8, between the pole housing 22 and the transmission housing 60, a brush holder plate 55 is arranged, which accommodates electric brushes 20, for electrically contacting a commutator 18 arranged on the rotor shaft 16. The brushes 20 can be formed as hammer brushes or preferably as tubular brushes. The brush holder plate 55 is produced as a plastic component, for example, and is preferably arranged radially completely within the stator housing 22. Axially adjacent to the brush holder plate 55, a shielding plate 29 is arranged transversely to the rotor shaft 16, which is formed with a metal layer 36, for example. The shielding plate 29 has a central aperture 32 through which the rotor shaft 16 projects. At a radially outer overlap region 40, the shielding plate 29 electrically conductively abuts on the stator housing 22. For example, at an edge 26 of an axial opening 24 of the stator housing 22, a flange 28 is formed, on which the shielding plate 29 abuts in the axial direction 8. The shielding plate 29 comprises at least one flatly conductive conductor layer 36, which serves as shield 29 for EMC radiation from the electric machine 10. Opposite the brush support plate 55, a bearing shield 56 is arranged on the other axial side of the shielding plate 29 and comprises a bearing receptacle 57 for a bearing component 58 of the rotor shaft 16. The bearing component 58 is formed, for example, as a cylindrical or spherical bearing made of metal. Preferably, the bearing component 58 is electrically conductively connected to the flatly conductive conductor layer 36 of the shielding plate 29. The bearing shield 56 is preferably axially connected to the brush holder plate 55 by means of clip or clamping elements 98 so that the shielding plate 29 between the brush holder plate 55 and the bearing shield 56 forms a sandwich component 70. The radial extent of the shielding plate 29 in the radial direction 7 is preferably greater than the radial extent of the brush holder plate 55. For example, the transmission housing 60 is connected to the stator housing 22 by means of connecting elements, whereby the shielding plate 29 is fixedly clamped and fixed between the flange 28 of the stator housing 22 and a mating flange 61 of the transmission housing 60. A connector plug 65 is arranged radially outside the stator housing 22 in order connected to the brushes 20 by means of an electrical connection 65 and contact elements 50.

Figure 2:
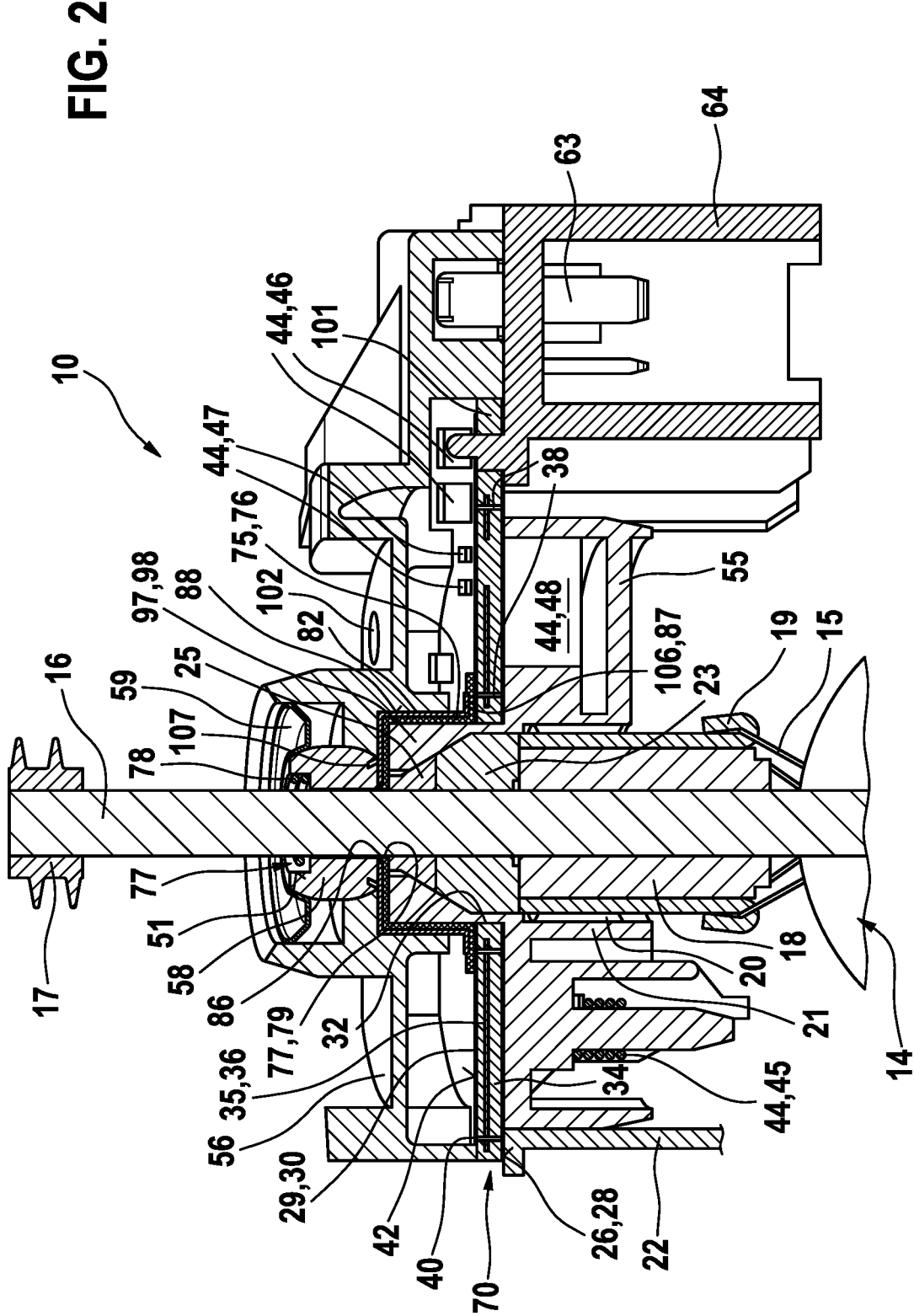
Figure 3:
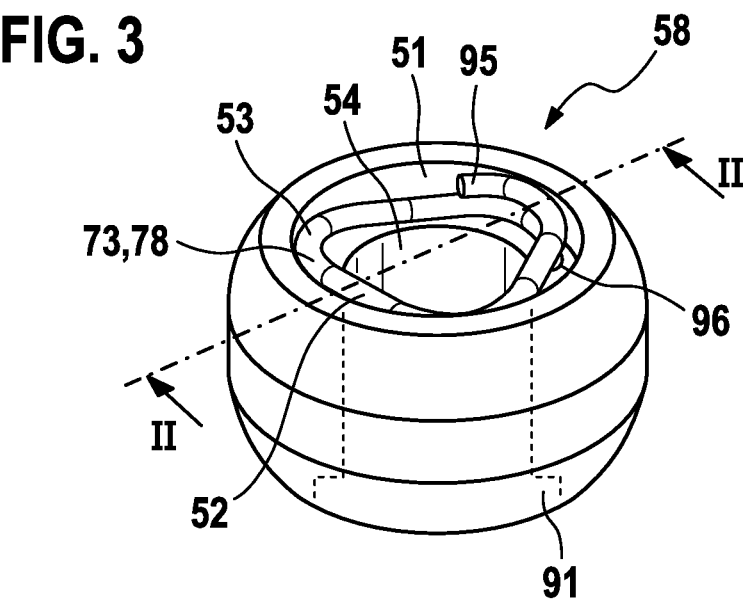
Figure 4:
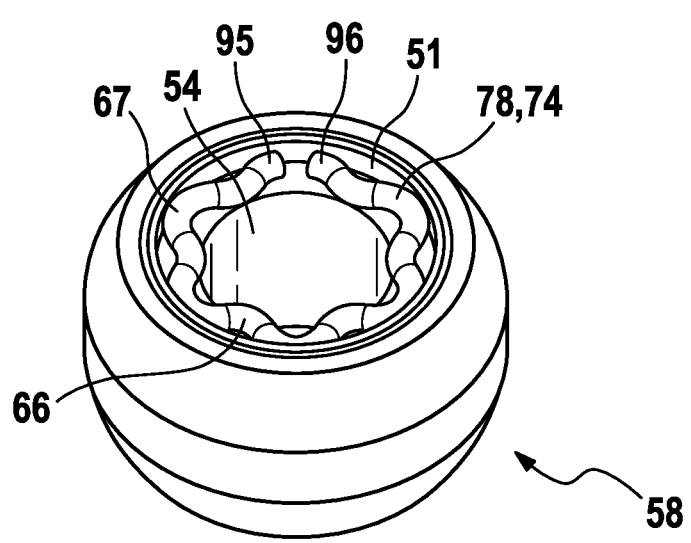

In FIG. 2, a further exemplary embodiment with different variants of a sliding contact 77 for ground contacting of the rotor shaft 16 is shown. For this purpose, in a first variant, a wire spring 78 is arranged within the bearing component 58 and, as a sliding contact 77, abuts radially resiliently on the rotor shaft 16. The bearing component 58 is fastened in a rotationally fixed manner in the bearing shield 56, for example by means of a clamping ring 59, which digs into the bearing shield 54 and abuts axially on the bearing component 58 in order to press it against the bearing receptacle 57. In the bearing component 58, a cylindrical receptacle 51 is formed, on which the wire spring 78 is supported radially outward. The receptacle 51 is deep enough in particular in the axial direction 8 so that the wire spring 78 does not axially protrude beyond the bearing component 58. In FIG. 3 and FIG. 4, two exemplary embodiments of such wire springs 78 are shown in more detail. In the first variant of FIG. 2, an adapter element 82 abuts axially on the bearing component 58 and electrically conductively connects the bearing component 58 to the shielding plate 29. The shielding plate 29 abuts axially on the flange 28 of the stator housing 22, which forms the ground contact. A reliable sliding contact 77 between the rotor shaft 16 and the bearing component 58 is thus produced via the wire spring 78 and is guided to the stator housing 22 without interruption via the adapter element 82 and the shielding plate 29. The adapter element 82 is produced, for example, as a cuboid hollow body made of sheet metal in order to shield a central aperture 32 of the shielding plate 29 for the rotor shaft 16 against EMC, wherein the separately produced adapter element 82 is inserted into the bearing shield 56. In this embodiment, both the central aperture 32 and, accordingly, a ground contact region 80 are approximately quadrilaterally formed around this central aperture 32 on the shielding plate 29. Likewise, the adapter element 82 has an approximately quadrilateral base surface 83 with a quadrilateral peripheral wall 84 formed thereon in the axial direction 8, the end face 106 of said wall being pressed axially against the ground contact region 80. The adapter element 82 also has an aperture 86 for the rotor shaft 16. At the periphery of this aperture 86, axial spring tongues 107 are formed, which are pressed axially against the bearing component 58. The conductive adapter element 82 is then clamped axially between the ground contact region 80 and the bearing component 58. A receptacle 88 into which the adapter element 82 is axially inserted is formed on the bearing shield 56 around the bearing seat 57 thereof. The receptacle 88 comprises radial holding elements 108, which are formed as a peripheral wall, for example. Since the outer periphery of the adapter element 82 in this embodiment is quadrilateral, the receptacle 88 has a corresponding quadrilateral cross-section so that the adapter element 82 is guided radially therein. At the same time, the quadrilateral form closure between the adapter element 82 and the receptacle 88 constitutes an anti-rotation device for the adapter element 82. For example, the adapter element 82 may be manufactured from sheet metal as a punched bent part, whereas the bearing shield 56 is manufactured as a plastic injection-molded part. Axially below the shielding plate 29, the brush holder plate 55 is arranged in the stator housing 22. Axial webs 97 are preferably integrally formed on the brush holder plate 55 and extend in the axial direction 8 through the central aperture 32 of the shielding plate 29 into the adapter element 82. The axial webs 97 are preferably formed as clamping elements 98, which press the adapter element 82 in the radial direction 7 against the receptacle 88 in the bearing shield 56. For this purpose, in particular, the latching tongues 99 are formed on the adapter element 82 and dig into the axial webs 97 and/or into the receptacle 88. As a result, the brush holder plate 55 with the bearing shield 56 and the intermediate shielding plate 29 forms a pre-assembled sandwich component 70 that can be axially inserted into the stator housing 22.

In a second variant, a metal, conductive nonwoven material or fabric 76 is inserted into the adapter element 82 and forms the sliding contact 77 with the rotor shaft 16. In this case, correspondingly to the aperture 86 in the adapter element 82, a hole 79 is likewise cut out of the nonwoven material 76, the peripheral edge of said hole radially abutting on the rotor shaft 16. Due to the fibrous formation of the conductive nonwoven material 76, the friction against the rotor shaft 16 is reduced so that the abrasion on the rotor shaft 16 is reduced, and a good electric sliding contact 77 to the rotor shaft 16 is produced at the same time. The nonwoven material 75 or a similar fabric contains electrically conductive fibers which are, for example, made of graphite or metal and are electrically conductively connected to one another. The nonwoven material 76 extends within the adapter element 82 from the aperture 86 to the shielding plate 29. Preferably, the adapter element 82 presses the nonwoven material 76 axially against the ground contact region 80 at the periphery of the central aperture 32 of the shielding plate 29. In this second variant, the sliding contact 77 is formed directly between the rotor shaft 16 and the nonwoven material 76 so that the adapter element 82 with the nonwoven material 76 inserted therein can also be arranged axially spaced apart from the bearing component 58 (in a different manner than as shown in FIG. 2). The ground contact then passes directly via the nonwoven material 76 onto the shielding plate 29 to the stator housing 22.

In both variants according to FIG. 2, the shielding plate 29 is formed as at least one flatly conductive metal layer 36 of a circuit board 30. Electronic components 44 are preferably arranged in SMD technology on this circuit board 30. Directly at the edge of the central aperture 32 of the circuit board 30, a Hall sensor 49 is arranged, which cooperates with a ring magnet 23 on the rotor shaft 16. Since the ring magnet 23 is located approximately in an axial plane with the Hall sensor 49 of the circuit board 30, the ring magnet 23 extends axially into the cavity of the adapter element 82. In this case, the ring magnet 23 and/or a guide element 25 arranged axially adjacently within the adapter element 82 is conical in order to spread the brushes 20 during the assembly of the brush holder plate 56. The brushes 20 are then arranged axially below the circuit board 30 in brush tubes 21 and abut radially on the commutator 18. The commutator 18 is connected to the electrical winding 15 of the rotor 14 by means of commutator hooks 19. The rotor shaft 16 extends from the stator housing 22 through the brush holder plate 55 and through the central aperture 32 of the circuit board 30 through the aperture 86 of the adapter element 82 through the bearing component 58 and projects with a free end into the transmission housing 60. At the free end, a gear worm is, for example, arranged as an output element 17. The circuit board 30 together with the adapter element 82 arranged thereon completely covers the axial opening 24 of the stator housing 22 against EMC radiation, wherein the rotor shaft 16 is sealed against electromagnetic radiation (EMC) by means of the conductive sliding contact 77. The circuit board 30 extends beyond the stator housing 22 at a certain peripheral region with a radial balcony 101 and is radially connected outside the flange 28 to a separate connector plug 64, in which the pins 63 for the power supply and for the Hall sensor 49 are arranged. The circuit board 30 is completely covered by the bearing shield 56, which likewise extends with a radial extension 100 radially beyond the flange 28 of the stator housing 22 in the region of the circuit board 30. A suppressor choke 45 and/or a varistor 46 and/or a capacitor 47 and/or a thermal switch 48 are arranged on the electronic circuit board 30 as electronic components 44. On a radially outer periphery of the circuit board 30, on the underside 41 thereof, an electrically conductive overlap region 40 with the stator housing 22 is formed peripherally and abuts conductively on the flange 28. This conductive overlap region 40 is formed by a metallic coating on an insulating substrate 34 of the circuit board 30 or by the removal of the outermost insulation layer so that the outer conductor layer 35 of the electronic circuit board 30 is exposed on the underside 41. This radially outer overlap region 40 is electrically connected to the flatly conductive conductor layer 36, which is arranged inside the electronic circuit board 30. In the exemplary embodiment, many individual vias (VIAS) 38 are formed distributed over the outer perimeter and connect the overlap region 40 to the other conductor layers 35, 36 of the electronic circuit board 30. The distance between the vias 38 is in particular at most 3 mm so that sufficient EMC shielding is available. Likewise, the ground contact region 80 at the central aperture 32 of the circuit board 30 is connected to the flatly conductive conductor layers 36 by means of vias (VIAS) 38. The individual vias (VIAS) 38 at the overlap region 40 and at the ground contact region 80 are axially formed continuously through the entire electronic circuit board 30 so that they each extend from the underside 41 to the top side 42 of the circuit board 30. The components 44 and the contact elements 50 for the brushes 20 are all formed as SMD components here so that the electronic circuit board 30 can be completely populated by means of a single SMD (surface-mounted devices) soldering process.

FIG. 3 shows a spherical bearing as a bearing component 58, in which a central through-hole 54 for the sliding accommodation of the rotor shaft 16 is formed. On an axial side, the cylindrical receptacle 51 for the wire spring 78 is concentrically formed in the bearing component 58. The wire spring 78 is formed here as a polygonal chain 73 that completely encloses the through-hole 54, wherein a wire end 96 overlaps a wire start 95 in particular at a certain peripheral angle. The wire spring 78 is, for example, approximately triangular so that the rounded corners 53 are radially supported on the outer wall of the cylindrical receptacle 51. The straight portions 52 of the wire spring 78 extend tangentially to the through-hole 54 and, when the rotor shaft 16 is inserted, abut radially resiliently thereon, in order to form an electric sliding contact 77, as can be seen in the section in FIG. 2. In principle, the polygonal chain 73 can also be quadrangular, pentagonal or hexagonal, wherein the straight sections 52 always form the sliding contact 77 with the rotor shaft 16.

FIG. 4 shows a further embodiment of a wire spring 78, which is formed as a corrugated ring 74. In this case, outward bent portions 67 are radially supported on the outer wall of the cylindrical receptacle 51. Intermediate, inward bent portions 66 radially overlap the through-hole 54 and, after insertion of the rotor shaft 16, abut radially resiliently thereon in order to form the electric sliding contact 77. In this embodiment, the wire end 96 does not overlap the wire start 95 so that the corrugated ring 74 does not completely enclose the through-hole 54.

In both embodiments according to FIGS. 3 and 4, the wire springs 78 are arranged axially completely within the cylindrical receptacle 51. Instead of the spherical bearing, the bearing component 58 may alternatively also be formed as a cylinder bearing, in which the cylindrical receptacle 51 for the wire spring 78 is hollowed out.

Figure 5:
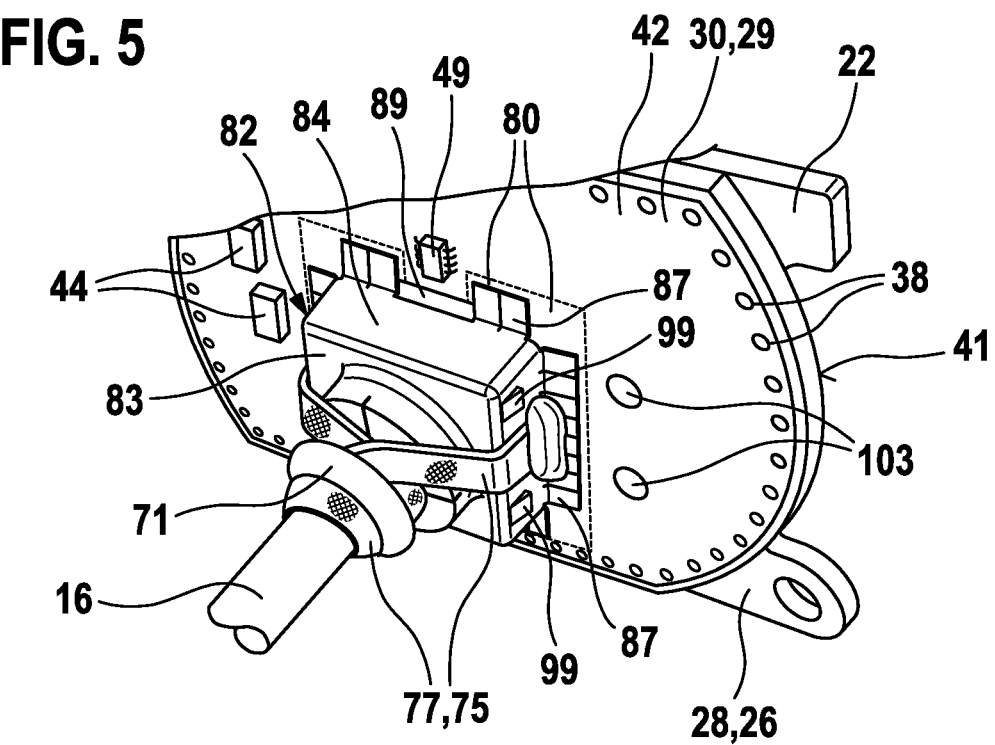

FIG. 5 shows a further embodiment of a sliding contact 77 according to the invention, in which a metal braiding 75 directly radially abuts on the rotor shaft 16. The metal braiding 75 is formed here as a type of metal strand, which encloses the rotor shaft 16 and is radially pressed against the rotor shaft 16, for example by means of an elastic element, such as a rubber ring 71. The metal braiding 75 is arranged directly axially adjacent to the adapter element 82 and is electrically conductively connected thereto. The metal braiding 75 may also be arranged directly in the aperture 86 or within the adapter element 82. The ground contact from the rotor shaft 16 is then established via the metal braiding 75 to the adapter element 82 to the shielding plate 29 to the stator housing 22. The adapter element 82 may thus also be arranged axially spaced apart from the bearing component 58. The metal braiding 75 is preferably soldered to the adapter element 82 but may also be connected thereto via a clamping connection. In this embodiment, the shielding plate 29 is again formed as an integral part of the circuit board 30, the ground contact region 80 of which abuts axially on the metal adapter element 82. In the region of the Hall sensor 49, a window 89, through which the Hall sensor 49 receives the magnetic signal of the ring magnet 23, is cut out of the peripheral wall 84 of the adapter element 82. This window 89 is formed as small as possible so that the EMC shield is interrupted by the adapter element 82 as little as possible.

Figure 6:
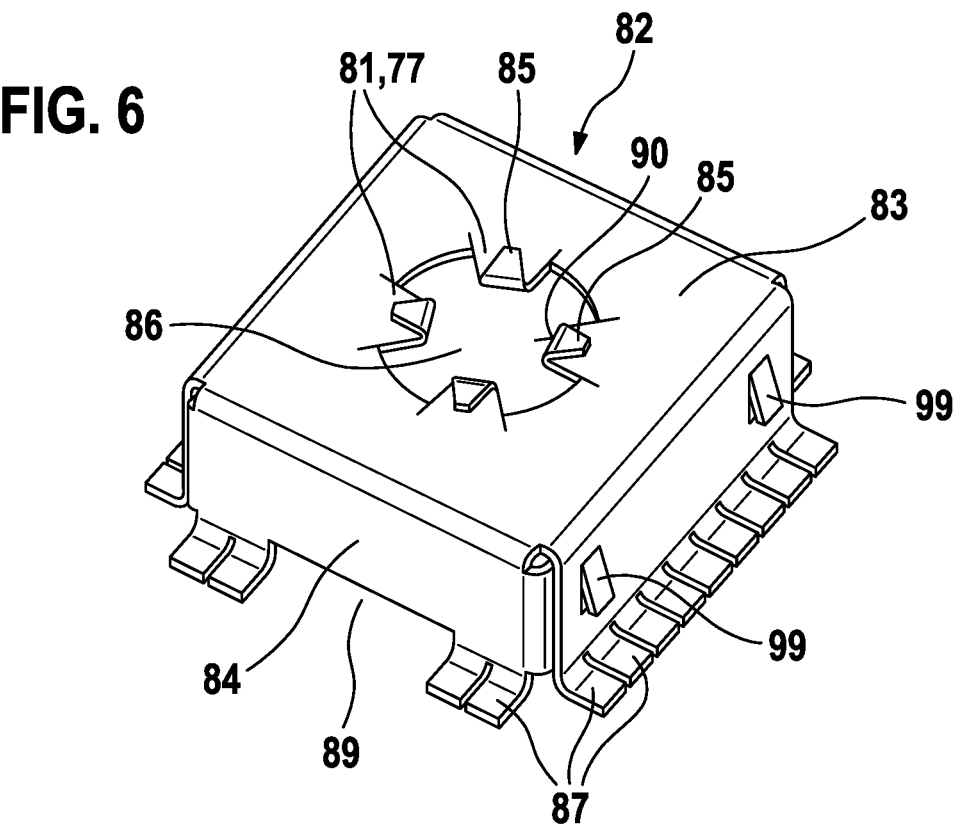

FIG. 6 shows a further embodiment according to the invention, in which the sliding contact 77 is directly integrally formed with the adapter element 82. For this purpose, at the periphery of the axial aperture 86, elastic sheet metal tongues 81 are punched out, which push radially resiliently against the installed rotor shaft 16 in order to form a sliding contact 77. Preferably, the radial tips 85 of the sheet metal tongues 81 are bent outward so that a folded edge 90 radially abuts on the rotor shaft 16. As a result, the wear of the rotor shaft 16 is reduced by the sliding contact 77 with the sheet metal tongues 81. For example, exactly four sheet metal tongues 81 are formed distributed over the periphery of the aperture 86, in particular at equal distances. The aperture 86 with the sheet metal tongues 81 is formed on a quadrilateral base surface 83, extending transversely to the rotor shaft 16, of the adapter element 82. This is integrally adjoined by a peripheral wall 84 of the adapter element 82, which extends approximately in parallel to the rotor shaft 16. In order to electrically contact the adapter element 82 with the ground contact region 80 of the circuit board 30, axially elastic spring elements 87 are formed on the peripheral wall 84 toward the circuit board 30 and compensate for irregularities at the surface of the ground contact region 80, which is in particular formed by a tin coating of the circuit board 30. In this embodiment as well, the adapter element 82 may be formed without electrical contact to the bearing component 58, in order to electrically contact the rotor shaft 16 with the ground of the stator housing 22. In order to fasten the adapter element 82 in the receptacle 88 in the bearing shield 56, radially outer latching tongues 99 are formed on the peripheral wall 84 and are pressed by the clamping elements 98 of the brush holder plate 55 radially against the holding elements 108 of the receptacle 88 and dig into them. The adapter elements 82 are preferably formed integrally as a punched bent part, for example made of electrically conductive tinplate or a brass sheet.

Figure 7:
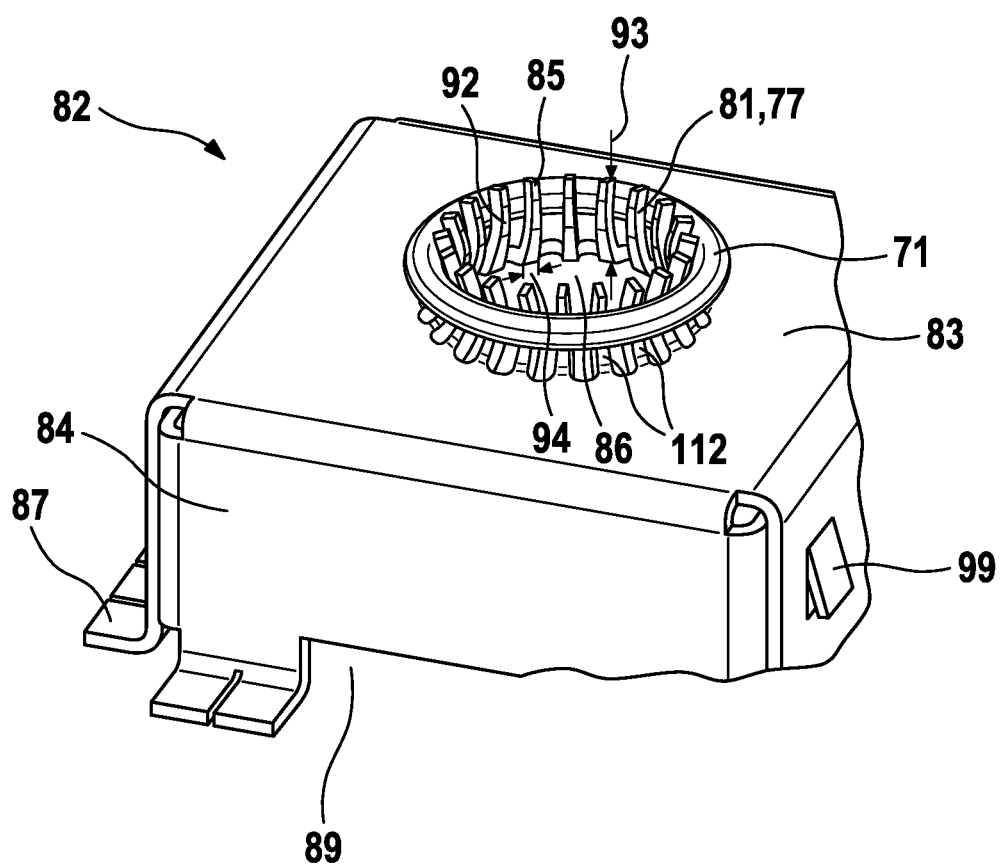

FIG. 7 shows a further embodiment according to the invention, in which the sliding contact 77 is directly integrally formed with the adapter element 82. In doing so, several punched elastic sheet metal tongues 81 on the perimeter of the axial aperture 86 are bent in the axial direction 8 so that they abut radially resiliently, preferably with a curvature 92, on the rotor shaft 16. The tips 85 of the sheet metal tongues 81 in this case point away from the adapter element 82 in the axial direction 8. For example, the axial extent 93 of the sheet metal tongues 81 is in this case significantly larger than the tangential extent 94 thereof at the connecting region toward the quadrilateral base surface 83 of the adapter element 82. In FIG. 7, more than ten, in particular twenty, sheet metal tongues 81 are formed distributed over the periphery of the aperture 86 of the adapter element 82. In order that these relatively narrow sheet metal tongues 81 radially abut on the rotor shaft 16 with sufficient pressing force, they are pressed radially against the rotor shaft 16 by means of an elastically resilient ring elements 71, in particular a rubber ring, preferably in the form of an O-ring. The resilient ring element 71 abuts on a radially outer side 112 of the radially inward curved sheet metal tongues 81. As a result of the many individual radial contact surfaces of the many sheet metal tongues 81, a very reliable sliding contact 77 to the rotor shaft 16 is formed and also causes very little abrasion on the rotor shaft 16. The material used for the integrally manufactured adapter element 82 is in particular a copper-zinc or copper-tin alloy or a tinplate, which have a sufficiently good electrical conductivity. In order to reduce the axial installation space of the electric machine 10, an annular axial recess 91, in which the axial tips 85 of the sheet metal tongues 81 axially engage, can be formed in the bearing component 58 on the side thereof facing the adapter element 82 (see FIG. 3).

Figure 8:
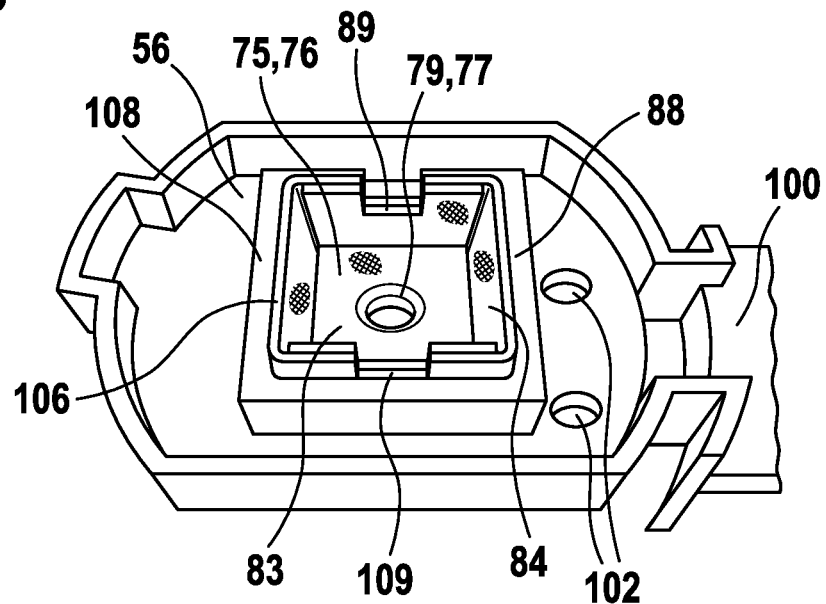

According to a further embodiment in FIG. 8, the adapter element 82 is produced entirely from an electrically conductive nonwoven material 76 or a metal braiding 75. At the quadrilateral base surface 83, the aperture 86 is formed in the nonwoven material 76 or in the metal braiding 75. The perimeter of the aperture 86 in the assembled state abuts on the rotor shaft 16 in a sliding manner and forms the sliding contact 77. The adapter element 82 is pressed with its peripheral wall 84 into the receptacle 88 of the bearing shield 56. The receptacle 88 is in particular formed as a peripheral axial wall, which approximately encloses the quadrilateral base surface 83. The nonwoven material 76 or the metal braiding 75 axially, electrically conductively abuts on the ground contact surface 80 of the circuit board 30 in order to contact the stator housing 22 via it. The bearing shield 56 has a radial extension 100, which extends in the installed state above the circuit board 30 and the connector plug 64 fastened thereto. The radial extension 100 is connected, in particular latched, axially to the connector plug 64 so that the radial balcony 101, extending radially beyond the edge 26 of the stator housing 22, of the circuit board 30 is axially accommodated between the radial extension 100 and the connector plug 64. For testing purposes, two holes 102, through which the electrical contacting of the circuit board 30 can be tested on corresponding contact pads 103, are formed in the bearing shield 56.

Figure 9:
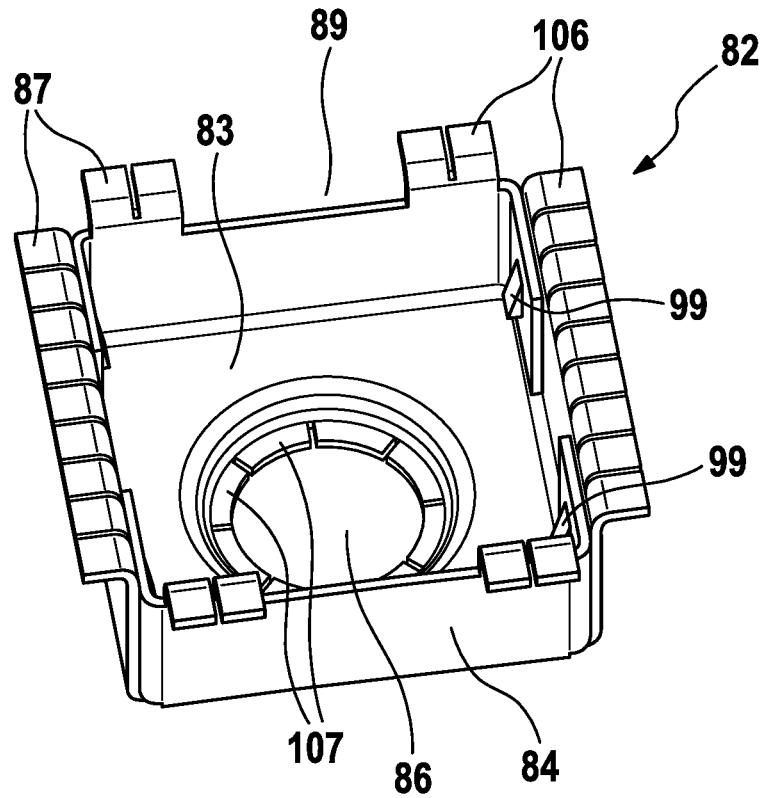

FIG. 9 shows a further embodiment of an adapter element 82 according to the invention according to a view in FIG. 6 from below, wherein this is used, for example, according to the first variant in FIG. 2. On the periphery of the aperture 86, axially resilient sheet metal tabs 107 are formed, which axially resiliently abut on the bearing component 58 in the installed state. The aperture 86 is shielded against EMC by means of the bearing component 58 and the rotor shaft 16. The ground contact is guided from the rotor shaft 16 via the bearing component 58 and the adapter element 82 via the shielding plate 29 to the stator housing 22. At the peripheral wall 84, the window 89 for the Hall sensor 49 is formed again. For symmetry reasons, an identical recess 109 is cut out radially opposite the window 89 for ease of assembly. Here, latching tongues 99, on which the axial webs 97 radially abut and latch thereto, are also formed on the inner side of the peripheral wall 84. As a result, on the one hand, the adapter element 82 is clamped via the outer latching tongues 99 to the bearing shield 56 on the one hand and via the inner latching tongues 99 to the brush holder plate 55 on the other hand. Located axially therebetween is the electronic circuit board 30 with the integrated shielding plate 29 in order to form the pre-assembled sandwich component 70.

It should be noted that with regard to the exemplary embodiments shown in the figures and in the description, a wide variety of possible combinations of the individual features with one another is possible. For example, the specific shape of the stator housing 22, of the transmission housing 60, and of the connector plug 64 may be adapted to the corresponding application of the electric machine 10. For example, depending on the requirements, the electronic circuit board 30 may also accommodate different electronic components 44. The configuration of the printed electronic circuit board 30 may likewise be varied and may be formed with, for example, less than or more than four conductor layers 35, wherein at least one flatly conductive conductor layer 36 is arranged. The central aperture 32 in the circuit board 30 may also have a cross-section that deviates from a quadrilateral shape. Instead of an electronic circuit board 30, the shielding plate 29 may also be formed as a metal sheet that abuts, on its radially outer edge, on the flange 28. The sliding contact 77 may be formed either directly on the bearing component 58 or on the adapter element 82, wherein the latter is characterized by the mechanical connection of the shielding plate 29 to the bearing shield 56. The invention is particularly suitable for the rotational drive of components or as an actuating drive for movable parts in the motor vehicle, for example window panes, sliding roofs or seat components, but is not limited to this application.

What is claimed is:

1. An electric machine (10) having a stator housing (22), which accommodates a stator (12) and a rotor (14), wherein the rotor (14) comprises a rotor shaft (16), and the stator housing (22) comprises an axial opening (24), through which the rotor shaft (16) projects out of the stator housing (22), wherein an electrically conductive shielding plate (29) is arranged transversely to the rotor shaft (16) and substantially covers an opening (24), and an electrically conductive sliding contact (77) surrounds and radially abuts a periphery of the rotor shaft (16) and is electrically conductively connected to the shielding plate (29).

2. The electric machine (10) according to claim 1, wherein on a periphery of the opening (24), a flange (28) is formed, which radially overlaps the shielding plate (29), and the shielding plate (29) conductively abuts, on its outer perimeter (31), axially on the flange (28) of the stator housing (22) in order to form a ground contact, wherein axially opposite the stator housing (22), a transmission housing (60) is arranged with a mating flange (61), which axially clamps the shielding plate (29) to the stator housing (22).

3. The electric machine (10) according to claim 1, wherein the sliding contact (77) is formed by an electrically conductive nonwoven material (76) or fabric.

4. The electric machine (10) according to claim 1, wherein the sliding contact (77) is formed by an electrically conductive metal braiding (75).

5. The electric machine (10) according to claim 1, wherein the sliding contact (77) is formed by at least one electrically conductive sheet metal tongue (81).

6. The electric machine (10) according to claim 1, wherein the sliding contact (77) is formed by an electrically conductive wire spring (78).

7. The electric machine (10) according to claim 6, wherein the wire spring (78) is formed as a polygonal chain (73) or as a corrugated ring (74), which extends substantially over an entire periphery of the rotor shaft (16).

8. The electric machine (10) according to claim 1, wherein a bearing shield (56) made of plastic is arranged axially spaced apart from the shielding plate (29) and mounts a central bearing receptacle (57) for a bearing component (58), which is formed as a cylinder bearing or spherical bearing.

9. The electric machine (10) according to claim 8, wherein axially between the bearing component (58) and the shielding plate (29), a separately manufactured, electrically conductive adapter element (82) is arranged and is electrically conductively connected to the shielding plate (29), and the adapter element (82) electromagnetically shields a central aperture (32) in the shielding plate (29).

10. The electric machine (10) according to claim 9, wherein the sliding contact (77) is arranged directly on the bearing component (58) or directly on the adapter element (82) or directly on the shielding plate (29).

11. The electric machine (10) according to claim 9, wherein the adapter element (82) comprises a cuboid cavity that conductively abuts with an axially open end face (106) on the shielding plate (29), and an entirety of the adapter element (82) is formed from an electrically conductive nonwoven material (76) or fabric, or the adapter element (82) is lined on its inner side with the electrically conductive nonwoven material (76) or fabric.

12. The electric machine (10) according to claim 9, wherein the adapter element (82) is clamped to the bearing shield (56), and the adapter element (82) is electrically conductively connected to the bearing component (58).

13. The electric machine (10) according to claim 9, wherein a brush holder plate (55) comprising electric brushes (20) is connected to the bearing shield (56), wherein clip or clamping elements (98) project axially through the central aperture (32) of the shielding plate (29) and press the adapter element (82) radially against holding elements (108) of the bearing shield (56).

14. The electric machine (10) according to claim 13, wherein the shielding plate (29) is formed as part of an electronic circuit board (PCB) (30), which is populated with at least one anti-interference element (44) and/or electric contact elements (50) for the brushes (20), wherein the electronic circuit board (30) comprises four conductor layers (35, 36), of which two axially inner conductor layers (36) are formed over their entire surface of conductive material.

15. The electric machine (10) according to claim 2, wherein on a top side (42), facing away from the flange (28), of the shielding plate (29), over a periphery of a central aperture (32) in the shielding plate (29), the shielding plate (29) comprises an axial ground contact region (80), on which an adapter element (82) electrically conductively abuts with axial spring elements (87).

16. The electric machine (10) according to claim 3, wherein the sliding contact (77) is formed by an electrically conductive nonwoven material (76) or fabric.

17. The electric machine (10) according to claim 8, wherein the bearing shield (56) is in a transmission housing (60).

18. The electric machine (10) according to claim 14, wherein the conductor layers (35, 36) are electrically connected to one another by several axial vias (38).

19. The electric machine (10) according to claim 4, wherein the electrically conductive metal braiding (75) is a strand.

20. An electric machine (10) having a stator housing (22), which accommodates a stator (12) and a rotor (14), wherein the rotor (14) comprises a rotor shaft (16), and the stator housing (22) comprises an axial opening (24), through which the rotor shaft (16) projects out of the stator housing (22), wherein an electrically conductive shielding plate (29) is arranged transversely to the rotor shaft (16) and substantially covers an opening (24), and an electrically conductive sliding contact (77) coupled to the rotor shaft (16) and is electrically conductively connected to the shielding plate (29), wherein on a periphery of the opening (24), a flange (28) is formed, which radially overlaps the shielding plate (29), and the shielding plate (29) conductively abuts, on its outer perimeter (31), axially on the flange (28) of the stator housing (22) in order to form a ground contact, wherein axially opposite the stator housing (22), a transmission housing (60) is arranged with a mating flange (61), which axially clamps the shielding plate (29) to the stator housing (22).

21. An electric machine (10) having a stator housing (22), which accommodates a stator (12) and a rotor (14), wherein the rotor (14) comprises a rotor shaft (16), and the stator housing (22) comprises an axial opening (24), through which the rotor shaft (16) projects out of the stator housing (22), wherein an electrically conductive shielding plate (29) is arranged transversely to the rotor shaft (16) and substantially covers an opening (24), and an electrically conductive sliding contact (77) coupled to the rotor shaft (16) and is electrically conductively connected to the shielding plate (29), wherein a bearing shield (56) made of plastic is arranged axially spaced apart from the shielding plate (29) and mounts a central bearing receptacle (57) for a bearing component (58), which is formed as a cylinder bearing or spherical bearing.

\* \* \* \* \*